US012603003B2

(12) United States Patent
Iwahori et al.

(10) Patent No.: US 12,603,003 B2
(45) Date of Patent: Apr. 14, 2026

(54) CONTROL DEVICE AND UNMANNED DRIVING METHOD

(71) Applicant: TOYOTA JIDOSHA KABUSHIKI KAISHA, Toyota (JP)

(72) Inventors: Kento Iwahori, Nagoya (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 18/735,350

(22) Filed: Jun. 6, 2024

(65) Prior Publication Data

US 2025/0006058 A1 Jan. 2, 2025

(30) Foreign Application Priority Data

Jun. 29, 2023 (JP) ................................. 2023-107093
Oct. 24, 2023 (JP) ................................. 2023-182654

(51) Int. Cl.
*G08G 1/16* (2006.01)
*B60W 60/00* (2020.01)

(52) U.S. Cl.
CPC ............. *G08G 1/16* (2013.01); *B60W 60/001* (2020.02)

(58) Field of Classification Search
CPC ........... B60W 60/001; B60W 60/0027; B60W 30/09; B60W 30/0956; B60W 30/18154; B60W 30/18159; B60W 2555/60
See application file for complete search history.

(56) References Cited

U.S. PATENT DOCUMENTS

2017/0301150 A1* 10/2017 Wojciechowski ..... G06Q 10/20
2017/0301233 A1* 10/2017 Witt ........................ G08G 1/087

2017/0320529 A1 11/2017 Nordbruch
2019/0279508 A1* 9/2019 Wang ................... G05D 1/0278
2021/0229656 A1* 7/2021 Dax ................. G08G 1/096811
2022/0022013 A1* 1/2022 Balasubramanian .. G08G 1/005
2023/0037767 A1* 2/2023 Yang ...................... G08G 1/167

FOREIGN PATENT DOCUMENTS

JP 2017-538619 A 12/2017

OTHER PUBLICATIONS

F. Pratissoli, et al., "Hierarchical Traffic Management of Multi-AGV Systems With Deadlock Prevention Applied to Industrial Environments," in IEEE Transactions on Automation Science and Engineering, vol. 21, No. 3, pp. 3155-3169, Jul. 2024, doi: 10.1109/TASE.2023.327 (Year: 2023).*

* cited by examiner

*Primary Examiner* — Fadey S. Jabr
*Assistant Examiner* — Mario C Gonzalez
(74) *Attorney, Agent, or Firm* — Oblon, McClelland, Maier & Neustadt, L.L.P.

(57) ABSTRACT

A control device includes: an information acquisition unit that acquires capability information of a plurality of moving objects that can be moved by unmanned driving, the capability information being related to at least one capability of avoidance capability of avoiding collision against an obstacle, and reduction capability of reducing an impact at a time of the collision against the obstacle; and a control unit that controls unmanned driving of at least one moving object of the plurality of moving objects, and, when the plurality of moving objects enter an intersection from different directions at a same time, controls the at least one moving object to cause the plurality of moving objects to pass the intersection according to a priority order determined in descending order of the at least one capability using the capability information.

4 Claims, 9 Drawing Sheets

Figure 5:
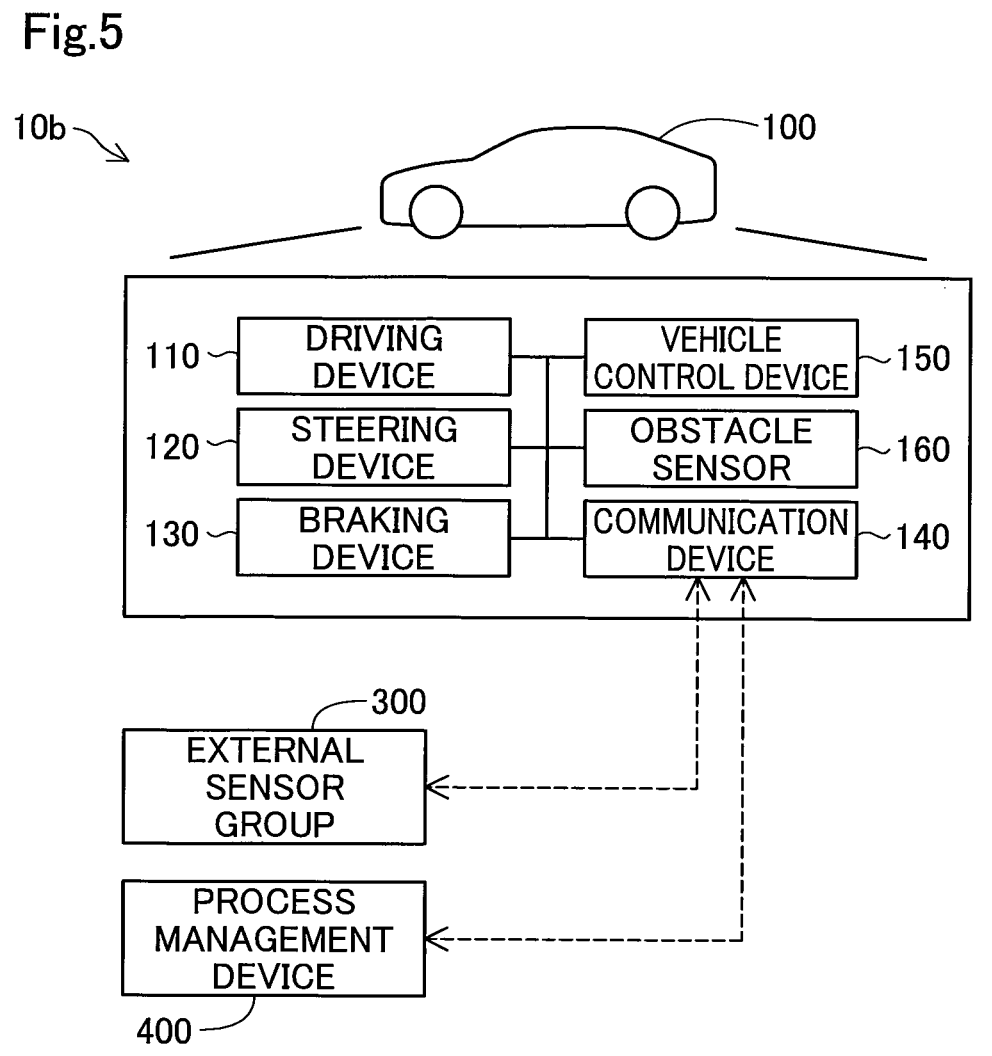

| 110 | DRIVING DEVICE | | VEHICLE CONTROL DEVICE | 150 |
| 120 | STEERING DEVICE | | OBSTACLE SENSOR | 160 |
| 130 | BRAKING DEVICE | | COMMUNICATION DEVICE | 140 |

300

EXTERNAL SENSOR GROUP

PROCESS MANAGEMENT DEVICE

400

VEHICLE

START

ACQUIRE VEHICLE LOCATION INFORMATION USING
DETECTION RESULT FROM EXTERNAL SENSOR    S11

DETERMINE NEXT
TARGET LOCATION    S21

GENERATE RUNNING
CONTROL SIGNAL    S31

CONTROL ACTUATOR USING
RUNNING CONTROL SIGNAL    S41

END

CONTROL DEVICE AND UNMANNED DRIVING METHOD

CROSS REFERENCE TO RELATED APPLICATIONS

The patent application claims the priority based on Japanese Patent Applications No. 2023-107093 filed on Jun. 29, 2023, and No. 2023-182654 filed on Oct. 24, 2023, the disclosure of which are hereby incorporated by reference in their entireties.

BACKGROUND

Field

The present disclosure relates to a control device and an unmanned driving method.

There is known a technique of causing a vehicle to run by unmanned driving in a vehicle manufacturing process (for example, Japanese Patent Application Publication (Translation of PCT Application) No. 2017-538619).

Above Japanese Patent Application Publication (Translation of PCT Application) No. 2017-538619 does not take into account which moving object is caused to pass an intersection in order when a plurality of moving objects enter the intersection from different directions at the time same.

SUMMARY

The present disclosure can be implemented as following aspects.

(1) A first aspect according to the present disclosure provides a control device. This control device includes: an information acquisition unit configured to acquire a capability information of a plurality of moving objects that can be moved by unmanned driving, wherein the capability information is related to at least one capability of avoidance capability of avoiding collision against an obstacle, and reduction capability of reducing an impact at a time of the collision against the obstacle; and a control unit configured to control unmanned driving of at least one moving object of the plurality of moving objects, wherein when the plurality of moving objects enter an intersection from different directions at a same time, the control unit controls the at least one moving object to cause the plurality of moving objects to pass the intersection according to a priority order determined in descending order of the at least one capability using the capability information.

The control device according to this aspect can reduce a probability that a preceding moving object collides against an obstacle at an intersection, and a course of a following moving object is blocked, and reduce an impact of the collision even if the preceding moving object collides against the obstacle at the intersection, so that it is possible to recover earlier the course of the following moving object blocked when the preceding moving object collides against the obstacle.

(2) In the control device according to the above aspect, the control unit may make the priority order higher as the avoidance capability is higher, and make the priority order higher as the reduction capability is higher in a case where the avoidance capability is the same.

The control device according to this aspect causes moving objects that have the higher avoidance capability to precede among the moving objects that have the higher avoidance capability and moving objects that have the lower avoidance capability, so that it is possible to reduce a probability that the preceding moving object collides against an obstacle.

(3) In the control device according to the above aspect, the capability information may include information indicating whether or not the moving object has an automatic avoidance function that is a function of automatically avoiding the collision against the obstacle, and the control unit may make the priority order of the moving object that has the automatic avoidance function higher than the priority order of the moving object that does not have the automatic avoidance function.

The control device according to this aspect causes moving objects that have the automatic avoidance function to precede among the moving objects that have the automatic avoidance function and moving objects that do not have the automatic avoidance function, so that it is possible to reduce the probability that the preceding moving object collides against an obstacle.

(4) In the control device according to the above aspect, the plurality of moving objects may be moved by unmanned driving in a factory that manufactures the plurality of moving objects, the capability information may include information indicating the number of times of reinspection of the moving object in the factory, and the control unit may make the priority order higher as the number of times of reinspection is smaller.

According to the control device according to this aspect, as the number of times of reinspection is smaller, a probability that a failure occurs in the moving object is low, so that it is possible to reduce the probability that the preceding moving object collides against an obstacle.

(5) A second aspect according to the present disclosure provides an unmanned driving method. This unmanned driving method includes: acquiring a capability information of a plurality of moving objects that can be moved by unmanned driving, wherein the capability information is related to at least one capability of avoidance capability of avoiding collision against an obstacle, and reduction capability of reducing an impact at a time of the collision against the obstacle; and moving the plurality of moving objects by unmanned driving, wherein when the plurality of moving objects enter an intersection from different directions at a same time, causing the plurality of moving objects to pass the intersection according to a priority order determined in descending order of the at least one capability using the capability information.

The unmanned driving method according to this aspect can reduce a probability that a preceding moving object collides against an obstacle at an intersection, and a course of a following moving object is blocked, and reduce an impact of the collision even if the preceding moving object collides against the obstacle at the intersection, so that it is possible to recover earlier the course of the following moving object blocked when the preceding moving object collides against the obstacle.

The present disclosure can be also implemented by various aspects other than the control device and the unmanned driving method. The present disclosure can be implemented as, for example, an unmanned driving system, a remote control system, a moving object manufacturing method, a computer program, and a recording medium having the computer program recorded thereon.

BRIEF DESCRIPTION OF DRAWINGS

FIG. 5 is an explanatory view illustrating a configuration of the unmanned driving system according to a second embodiment;

DETAILED DESCRIPTION

A. First Embodiment

Figure 1A:
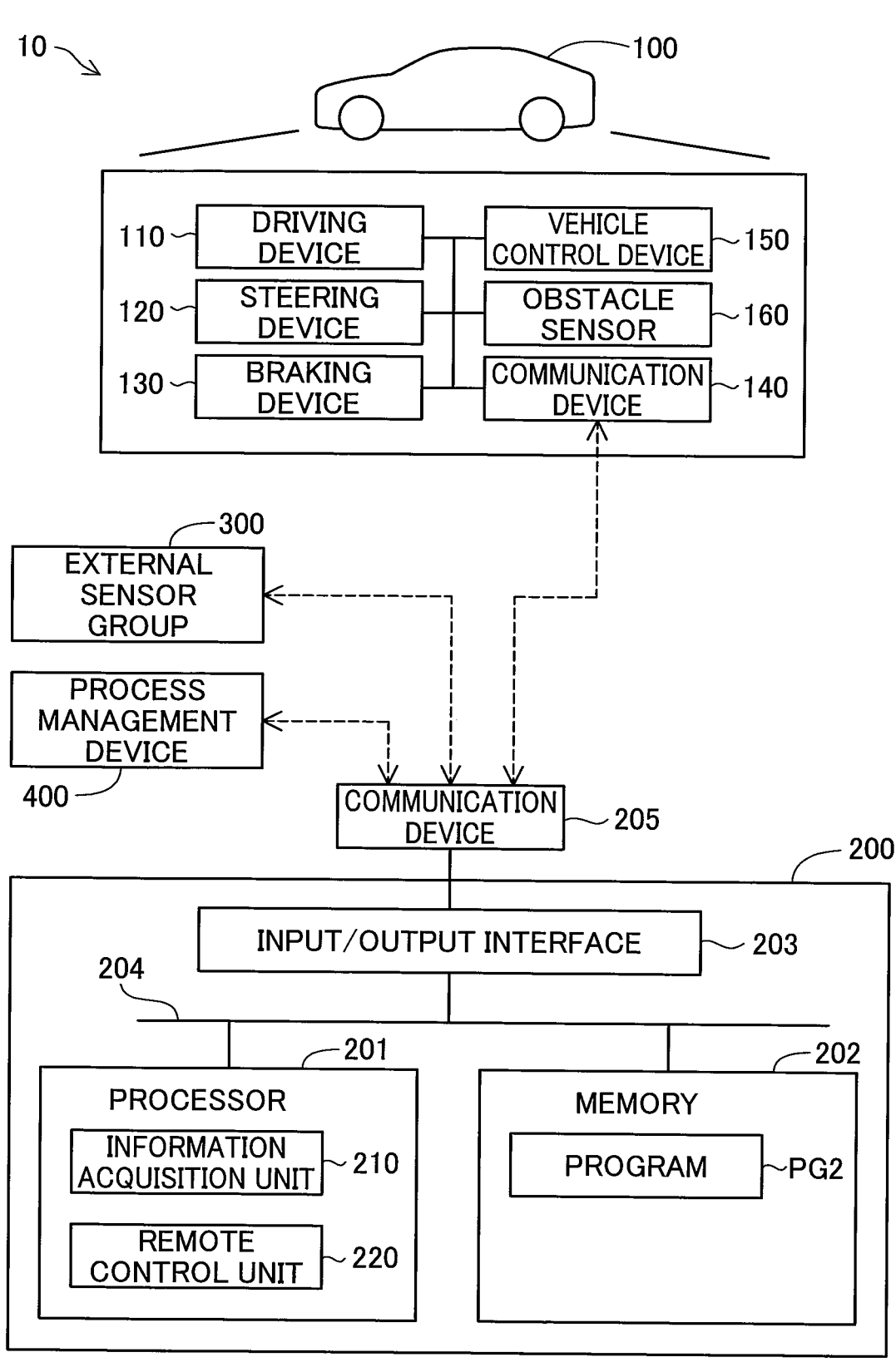
FIG. 1A is an explanatory view illustrating a configuration of an unmanned driving system.

FIG. 1A is an explanatory view illustrating a configuration of an unmanned driving system 10 according to the first embodiment. The unmanned driving system 10 is used to move a moving object by unmanned driving in a factory that manufactures moving objects.

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

In the present embodiment, the unmanned driving system 10 includes a vehicle 100 that is a moving object, a remote control device 200, an external sensor group 300 that is installed in the factory, and a process management device 400 that manages a manufacturing process of the vehicle 100 in the factory. Note that the remote control device 200 will be also referred to simply as a control device. The unmanned driving system 10 will be also referred to as a remote control system.

In the present embodiment, the vehicle 100 is configured to be able to run by remote control. The vehicle 100 is configured as an electric vehicle. The vehicle 100 includes a driving device 110 that accelerates the vehicle 100, a steering device 120 that changes a traveling direction of the vehicle 100, a braking device 130 that decelerates the vehicle 100, a communication device 140 that communicates with the remote control device 200 by wireless communication, and a vehicle control device 150 that controls each unit of the vehicle 100. In the present embodiment, the driving device 110 includes a battery, a running motor that is driven using power of the battery, and driving wheels that are rotated by the running motor.

Figure 1B:
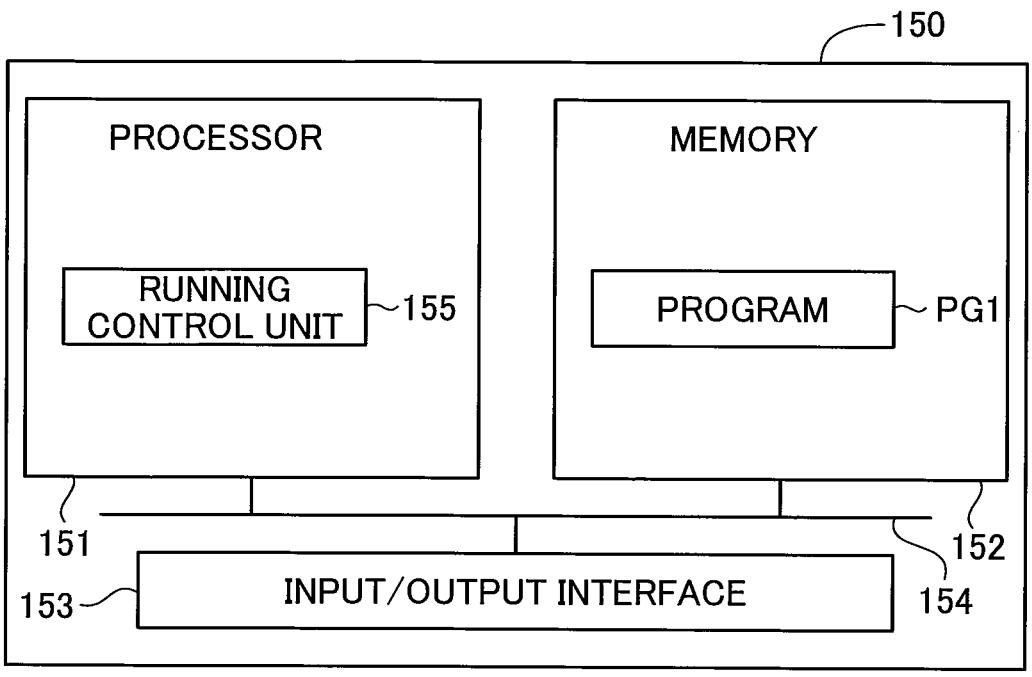
FIG. 1B is an explanatory view illustrating a configuration of a vehicle control device according to a first embodiment.

FIG. 1B is an explanatory view illustrating the configuration of the vehicle control device 150. The vehicle control device 150 is configured as a computer that includes a processor 151, a memory 152, an input/output interface 153, and an internal bus 154. The processor 151, the memory 152, and the input/output interface 153 are bidirectionally communicably connected through the internal bus 154. The input/output interface 153 is connected with the driving device 110, the steering device 120, the braking device 130, the communication device 140, and an obstacle sensor 160. The processor 151 functions as a running control unit 155 that executes running control of the vehicle 100 by executing a computer program PG1 stored in advance in the memory 152. "Running control" refers to, for example, adjustment of an acceleration, a speed, and a steering angle of the vehicle 100. The running control unit 155 causes the vehicle 100 to run by executing running control, in other words, by controlling the driving device 110, the steering device 120, and the braking device 130. The running control unit 155 can cause the vehicle 100 to run by controlling the various devices 110 to 130 in response to a passenger's operation when the passenger is in the vehicle 100. In the present embodiment, the running control unit 155 can cause the vehicle 100 to run by controlling the various devices 110 to 130 in response to a control command received from the remote control device 200 irrespectively of whether or not the passenger is in the vehicle 100. Note that the running control unit 155 will be also referred to simply as a control unit.

As illustrated in FIG. 1A, in the present embodiment, the vehicle 100 further includes the obstacle sensor 160 that detects obstacles around the vehicle 100. The obstacle sensor 160 is, for example, a camera, a Light Detection and Ranging (LiDAR), or a millimeter wave radar. The vehicle 100 has an automatic avoidance function of avoiding collision against an obstacle using the steering device 120 and the braking device 130 irrespectively of a driver's operation or a control command from the remote control device 200 when collision of the obstacle detected by the obstacle sensor 160 and the vehicle 100 is predicted. Note that the vehicle 100 may not have the automatic avoidance function in other embodiments. In this case, the vehicle 100 may not include the obstacle sensor 160.

The remote control device 200 is a control device that remotely controls the vehicle 100. The remote control device 200 is configured as a computer that includes a processor 201, a memory 202, an input/output interface 203, and an internal bus 204. The processor 201, the memory 202, and the input/output interface 203 are bidirectionally communicably connected via the internal bus 204. The input/output interface 203 is connected with a communication device 205 that communicates with the vehicle 100 by wireless communication. In the present embodiment, the communication device 205 can communicate with the external sensor group 300 and the process management device 400 by wired communication or wireless communication.

The processor 201 functions as an information acquisition unit 210 and a remote control unit 220 by executing a computer program PG2 stored in advance in the memory 202. The information acquisition unit 210 acquires capability information related to at least one capability of capability of avoiding collision of the vehicle 100 against an obstacle, and capability of reducing an impact at a time of the collision against the obstacle. In the following description, the capability of avoiding collision against an obstacle will be referred to as avoidance capability, and the capability of reducing an impact at a time of the collision against the obstacle will be referred to as reduction capability. In the present embodiment, the information acquisition unit 210 acquires capability information including information related to both of the avoidance capability and the reduction capability of the vehicle 100. The remote control unit 220 causes the vehicle 100 to run by generating a control command for remotely controlling the vehicle 100, and transmitting the control command to the vehicle 100. In the present embodiment, the control command refers to a running control signal to be described later. Note that the remote control device 200 will be also referred to simply as a control device, and the remote control unit 220 will be referred to simply as a control unit.

The external sensor group 300 includes a plurality of external sensors. The external sensors are sensors installed outside the vehicle 100. The external sensors are used to detect the position and the direction of the vehicle 100. In the present embodiment, the external sensor group 300 includes a plurality of cameras installed in the factory. Each camera includes an unillustrated communication device, and can communicate with the remote control device 200 by wired communication or wireless communication.

The process management device 400 manages the entire manufacturing process of the vehicle 100 in the factory. The process management device 400 includes at least one computer. The process management device 400 includes an unillustrated communication device, and can communicate with the remote control device 200 by wired communication or wireless communication. The process management device 400 transmits an identification number and the capability information of the remote control target vehicle 100 to the remote control device 200 when the remote control device 200 starts remotely controlling the vehicle 100.

Figure 2A:
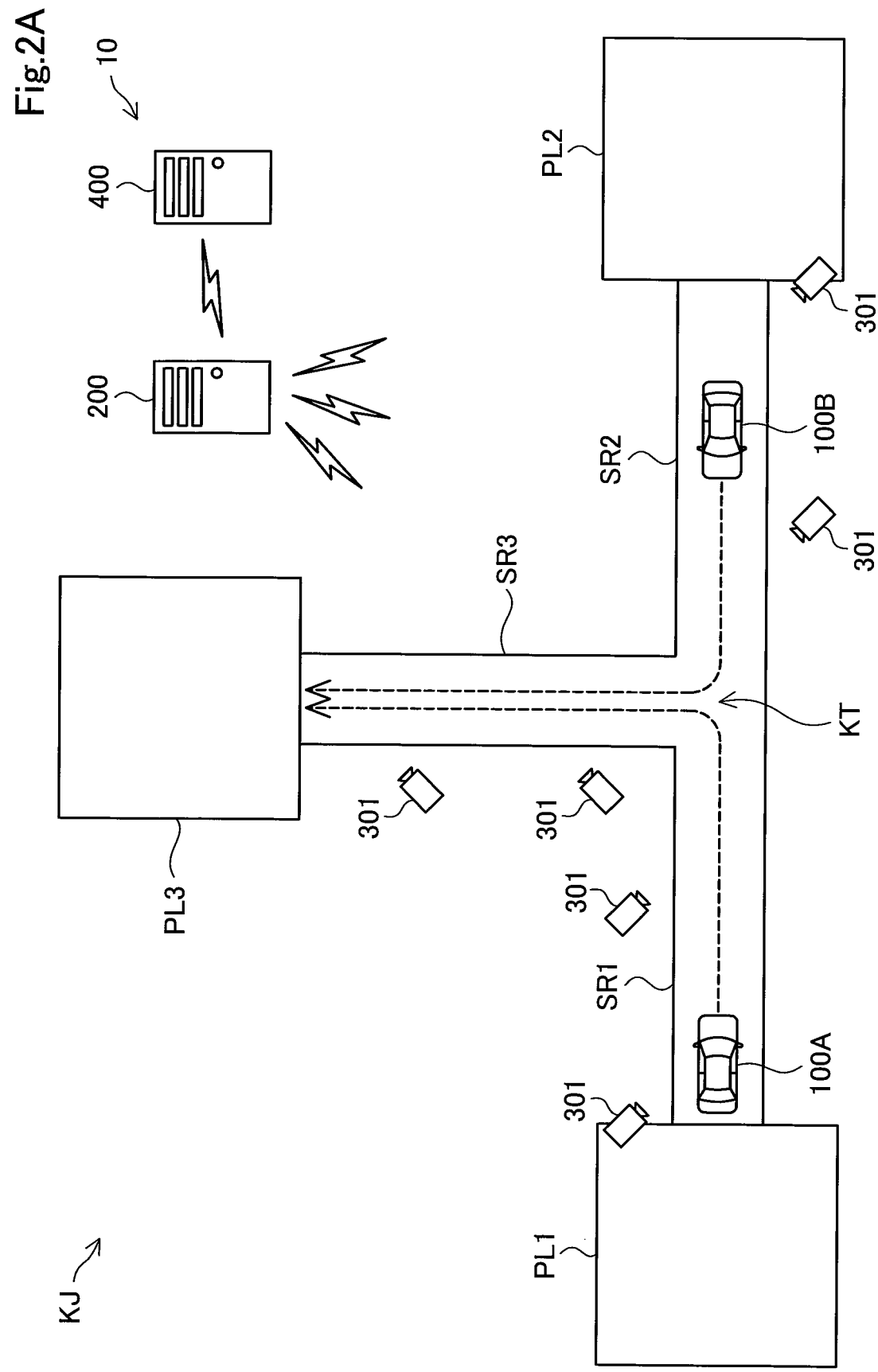
FIG. 2A is an explanatory view illustrating how a vehicle is moved by remote control in a factory.

FIG. 2A is an explanatory view illustrating how the vehicle 100 is moved by remote control in a factory KJ. FIG. 2A illustrates two vehicles 100A and 100B. In the following description, in a case where the two vehicles 100A and 100B will be described without being distinguished in particular, the vehicles 100A and 100B will be referred to simply as the vehicles 100. In the present embodiment, the factory KJ includes a first place PL1, a second place PL2, and a third place PL3. At the first place PL1 and the second place PL2, the vehicles 100 is assembled. At the third place PL3, the vehicle 100 assembled at the first place PL1 and the vehicle 100 assembled at the second place PL2 are inspected. Each of the places PL1 to PL3 is connected by a track SR on which the vehicles 100 can run. The track SR is provided with an intersection KT. In the following description, in the track SR, a portion between the first place PL1 and the intersection KT will be referred to as a first track SR1, a portion between the second place PL2 and the intersection KT will be referred to as a second track SR2, and a portion between the intersection KT and the third place PL3 will be referred to as a third track SR3. In a case where the tracks SR1 to SR3 do not need to be distinguished in particular, the tracks SR1 to SR3 will be referred to simply as the tracks SR.

At least the driving devices 110, the steering devices 120, the braking devices 130, the communication devices 140, and the vehicle control devices 150 are installed to the vehicle 100 assembled at the first place PL1 and the vehicle 100 assembled at the second place PL2. The vehicle 100 assembled in the first place PL1 is remotely controlled by the remote control device 200 to run from the first place PL1 to the third place PL3 via the intersection KT, and the vehicle 100 assembled in the second place PL2 is remotely controlled by the remote control device 200 to run from the second place PL2 to the third place PL3 via the intersection KT. The vehicle 100 having passed inspection at the third place PL3 is shipped from the factory KJ. The vehicle 100 that has not passed inspection is repaired, and then inspected again.

A method for moving the vehicle 100 by remote control by the remote control unit 220 will be briefly described with reference to FIG. 2A. The remote control unit 220 determines a target route for the vehicle 100 to run toward a destination through the track SR. In the present embodiment, the target route refers to a reference route to be described later. A plurality of the cameras 301 that shoot the track SR are installed in the factory KJ, and the remote control unit 220 can acquire a relative position and direction of the vehicle 100 with respect to the target route in real time by analyzing a video shot by each camera 301. The plurality of cameras 301 are included in the external sensor group 300. The remote control unit 220 generates a control command for causing the vehicle 100 to run along the target route, and transmits the control command to the vehicle 100. In the present embodiment, the control command refers to a running control signal to be described later. The vehicle control device 150 mounted on the vehicle 100 causes the vehicle 100 to run by controlling the driving device 110, the steering device 120, and the braking device 130 according to the received control command. Consequently, it is possible to cause the vehicle 100 to move without using a conveyance device such as a crane or a conveyor.

In the present embodiment, the remote control unit 220 can cause a plurality of the vehicles 100A and 100B to simultaneously run in parallel by remote control. For example, the remote control unit 220 can cause the vehicle 100A to move from the first place PL1 to the third place PL3 by remote control while causing the vehicle 100B to move from the second place PL2 to the third place PL3 by remote control.

Figure 2B:
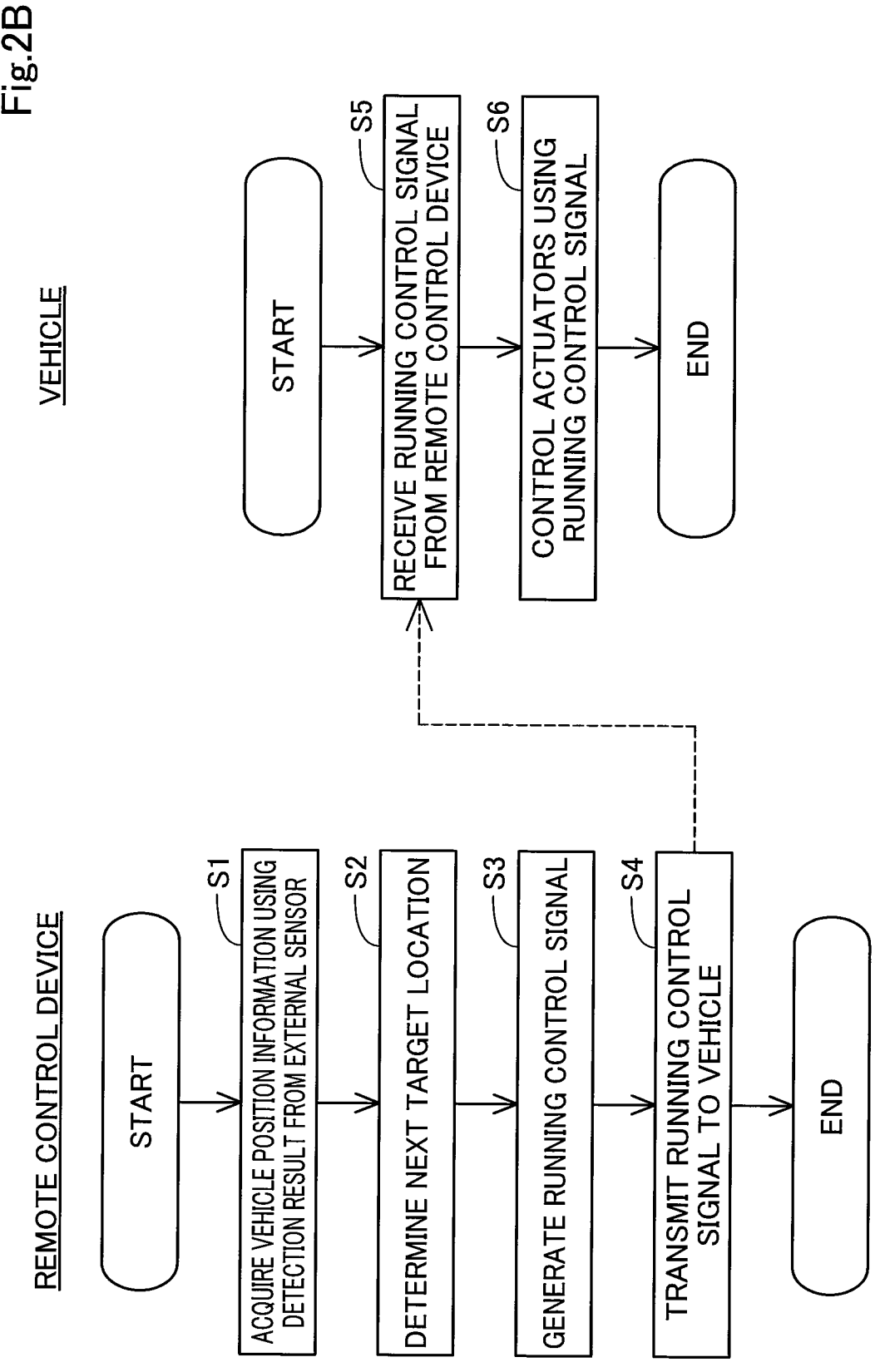
FIG. 2B is a flowchart illustrating a procedure of running control of the vehicle according to the first embodiment.

FIG. 2B is a flowchart illustrating a process procedure of running control of the vehicle 100 in the first embodiment. Step S1 to step S4 are repeatedly executed by the processor 201 of the remote control device 200, whereas step S5 to step S6 are repeatedly executed by the processor 151 of the vehicle control device 150. In the step S1, the remote control device 200 acquires vehicle location information of the vehicle 100 using detection results output from the external sensor, which is a sensor located outside the vehicle 100. The vehicle location information is position information that serves as the basis for generating running control signals. In the present embodiment, the vehicle location information includes the position and orientation of the vehicle 100 in the reference coordinate system of the factory KJ. In the present embodiment, the reference coordinate system of the factory KJ is the global coordinate system, and any location in the factory KJ is expressed with X, Y, and Z coordinates in the global coordinate system. In the present embodiment, the external sensor is the camera 301, and the external sensor outputs a captured image as a detection result. That is, in the step S1, the remote control device 200 acquires the vehicle location information using captured images acquired from the camera 301, which is the external sensor.

More specifically, in step S1, the remote control device 200 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the unmanned driving system 10 or outside the unmanned driving system 10. The detection model is stored in advance in the memory 202 of the remote control device 200, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The remote control device 200 can acquire the orientation of the vehicle 100 through estimation based on the direction of a motion vector of the vehicle 100 detected from change in location of a feature point of the vehicle 100 between frames of the captured images using optical flow process, for example.

In step S2, the remote control device 200 determines a target location to which the vehicle 100 is to move next. In the present embodiment, the target location is expressed by X, Y, and Z coordinates in the global coordinate system. The memory of the remote control device 200 contains the reference route stored in advance as a route along which the vehicle 100 is to run. The route is expressed by a node indicating a departure place, a node indicating a way point, a node indicating a destination, and a link connecting nodes to each other. The remote control device 200 determines the target location to which the vehicle 100 is to move next using the vehicle location information and the reference route. The remote control device 200 determines the target location on the reference route ahead of a current location of the vehicle 100.

In step S3, the remote control device 200 generates a running control signal for causing the vehicle 100 to run toward the determined target location. In the present embodiment, the running control signal includes an acceleration and a steering angle of the vehicle 100 as parameters. The remote control device 200 calculates a running speed of the vehicle 100 from transition of the location of the vehicle 100 and makes comparison between the calculated running speed and a target speed of the vehicle 100 determined in advance. If the running speed is lower than the target speed, the remote control device 200 generally determines an acceleration in such a manner as to accelerate the vehicle 100. If the running speed is higher than the target speed as, the remote control device 200 generally determines an acceleration in such a manner as to decelerate the vehicle 100. If the vehicle 100 is on the reference route, The remote control device 200 determines a steering angle and an acceleration in such a manner as to prevent the vehicle 100 from deviating from the reference route. If the vehicle 100 is not on the reference route, in other words, if the vehicle 100 deviates from the reference route, the remote control device 200 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the remote control device 200 transmits the generated running control signal to the vehicle 100. The remote control device 200 repeats the acquisition of vehicle location information, the determination of a target location, the generation of a running control signal, the transmission of the running control signal, and others in a predetermined cycle.

In step S5, the vehicle control device 150 of the vehicle 100 receives the running control signal transmitted from the remote control device 200. In step S6, the vehicle control device 150 controls the driving device 110, the steering device 120, the braking device 130 using the received running control signal, thereby causing the vehicle 100 to run at the acceleration and the steering angle indicated by the running control signal. The vehicle control device 150 repeats the reception of a running control signal and the control over the various devices 110 to 130 in a predetermined cycle.

Figure 3:
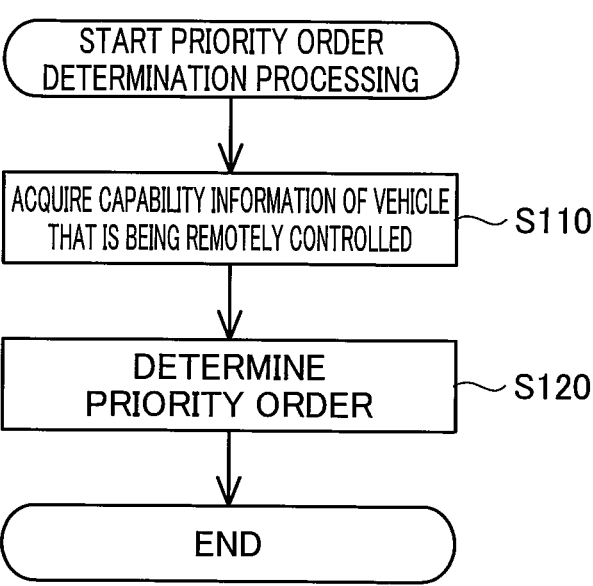
FIG. 3 is a flowchart illustrating contents of priority order determination processing.

FIG. 3 is a flowchart illustrating contents of priority order determination processing. The priority order determination processing is repeatedly executed by the remote control device 200 during a period in which the vehicle 100 is remotely controlled. When the priority order determination processing starts, the information acquisition unit 210 acquires the capability information of each remote control target vehicle 100 from the process management device 400 in step S110.

In step S120, the remote control unit 220 determines a priority order of each vehicle 100 using the capability information. In the present embodiment, the remote control unit 220 makes the priority order of the vehicle 100 higher as the avoidance capability of the vehicle 100 is higher. In a case where the avoidance capability is the same, in other words, in a case where it is not possible to determine whether the avoidance capability is good or bad, the remote control unit 220 makes the priority order of the vehicle 100 higher as the reduction capability of the vehicle 100 is higher.

As for the avoidance capability, for example, the vehicles 100 that have the automatic avoidance function have the higher avoidance capability among the vehicles 100 that have the automatic avoidance function and the vehicles 100 that do not have the automatic avoidance function. Hence, in the present embodiment, the remote control unit 220 makes the priority order of the vehicles 100 that have the automatic avoidance function higher than the priority order of the vehicles 100 that do not have the automatic avoidance function. Furthermore, in a case where the avoidance capability of the automatic avoidance function is enhanced by machine learning, the vehicles 100 that have been trained have the higher avoidance capability among the vehicles 100 that have been trained and the vehicles 100 that have not been trained. Hence, in the present embodiment, the remote control unit 220 makes the priority order of the vehicles 100 that have been trained higher than the priority order of the vehicles 100 that have not been trained upon comparison between the vehicles 100 that have the automatic avoidance function.

As for the avoidance capability, there is a case where a maximum speed, a braking force, a steering angle, or the like of the vehicle 100 is limited when the vehicle 100 is caused to run in the factory KJ, and, in addition, the limitation is delimited before shipping. The vehicles 100 whose braking forces or steering angles are not limited have the higher avoidance capability among the vehicles 100 whose braking forces or steering angles are limited and the vehicles 100 whose braking forces or steering angles are not limited. Hence, in the present embodiment, when it is not possible to determine whether the avoidance capability is good or bad according to whether or not the automatic avoidance function is provided, the remote control unit 220 makes the priority order of the vehicles 100 whose braking forces or steering angles are not limited higher than the priority order of the vehicles 100 whose braking forces or steering angles are limited.

As for the avoidance capability, since, as the number of times of reinspection of the steering device 120, the braking device 130, or the obstacle sensor 160 is smaller, a probability is low that a failure occurs in the steering device 120, the braking device 130, or the obstacle sensor 160, the avoidance capability is high. Hence, in the present embodiment, when it is not possible to determine whether the avoidance capability is good or bad according to whether or not the automatic avoidance function is provided or whether or not the braking force or the like is limited, the remote control unit 220 makes the priority order of the vehicles 100 higher as the number of times of reinspection of the steering device 120, the braking device 130, or the obstacle sensor 160 is smaller.

As for the reduction capability, since, as the weight of the vehicle 100 is lighter, the kinetic energy of the vehicle 100 is less, the reduction capability is high. Hence, in the present embodiment, the remote control unit 220 makes the priority order of the vehicle 100 higher as the weight of the vehicle 100 is lighter. The vehicles 100 that include front bumpers have the higher reduction capability among the vehicles 100 that include the front bumpers and the vehicles 100 that do not include the front bumpers. Hence, in the present embodiment, the remote control unit 220 makes the priority order of the vehicles 100 that include the front bumpers higher than the priority order of the vehicles 100 that do not include the front bumpers. In a case where the lighter vehicle 100 does not have the front bumper and the heavier vehicle 100 has the front bumper upon comparison between the two vehicles 100 of different weights, the remote control unit 220 makes the priority order of the one vehicle that satisfies the predetermined conditions higher than the priority order of the other vehicle.

In the present embodiment, in a case where the avoidance capability is the same and the reduction capability is the same, in other words, in a case where it is not possible to determine whether the avoidance capability and the reduction capability are good or bad, the remote control unit 220 makes the priority order of the vehicle 100 that is about to enter the intersection from a predetermined direction higher. For example, the remote control unit 220 makes the priority order of the vehicle 100 that is about to enter the intersection KT from the first track SR1 higher than the priority order of the vehicle 100 that is about to enter the intersection KT from the second track SR2. Note that, in a case where it is not possible to determine whether the avoidance capability and the remote control unit are good or bad, the remote control unit 220 may make the priority order of the vehicle 100 that is about to enter the intersection KT from the first track SR1 lower than the priority order of the vehicle 100 that is about to enter the intersection KT from the second track SR2. Then, the remote control unit 220 finishes the priority order determination processing. Note that step S110 will be referred to as an information acquisition process, and step S120 will be referred to as a priority order determination process.

Figure 4:
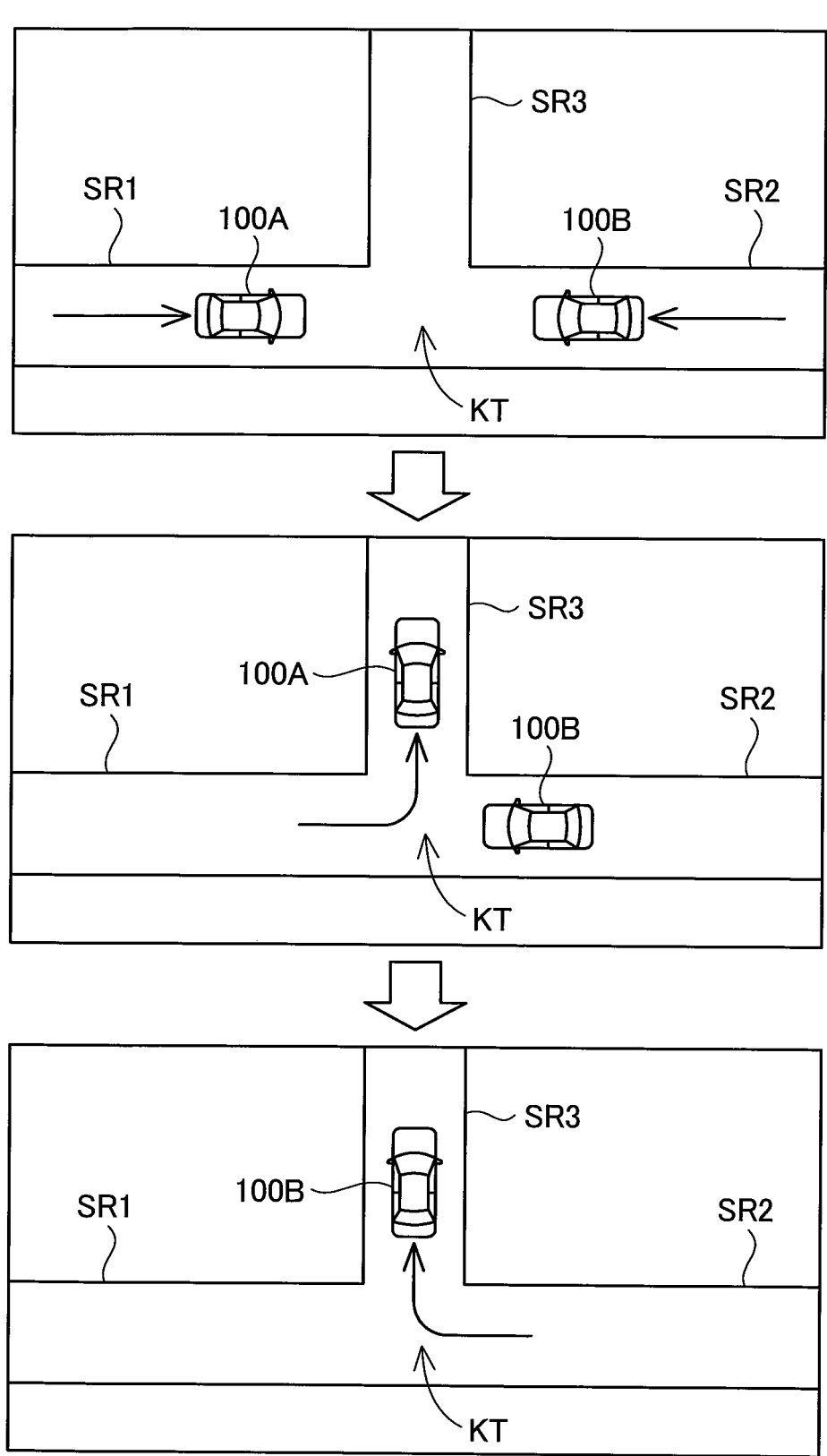
FIG. 4 is an explanatory view illustrating how a plurality of vehicles pass an intersection.

FIG. 4 is an explanatory view illustrating how the two vehicles 100A and 100B pass the intersection KT according to the priority orders determined by the priority order determination processing. A remote control method for the vehicles 100A and 100B according to the present embodiment will be described with reference to FIG. 4. Note that the remote control method will be also referred to as an unmanned driving method. A process of causing the vehicles 100A and 100B to move by remote control will be also referred to as a remote control process or an unmanned driving process. In FIG. 4, the priority order of the vehicle 100A is higher than the priority order of the vehicle 100B. When the two vehicles 100A and 100B are about to enter the intersection KT from different directions at the same time as illustrated in the upper part in FIG. 4, the remote control unit 220 causes the vehicle 100A having the higher priority order among the two vehicles 100A and 100B to enter the intersection KT, and causes the vehicle 100B having the lower priority order to standby for entering the intersection KT as illustrated at the middle part in FIG. 4. In the present embodiment, the remote control unit 220 causes the vehicle 100B to stop and thereby standby for entering the intersection KT. Note that the remote control unit 220 may cause the vehicle 100B to decelerate without stopping and thereby standby for entering the intersection KT. As illustrated at the lower part in FIG. 4, after the vehicle 100A passes the intersection KT, the remote control unit 220 causes the vehicle 100B to pass the intersection KT.

According to the unmanned driving system 10 according to the above-described present embodiment, when the plurality of vehicles 100 are about to enter the intersection KT from different directions at the same time, the remote control unit 220 causes the plurality of vehicles 100 to pass the intersection KT in descending order of the priority order determined using the capability information. Consequently, it is possible to prevent the plurality of vehicles 100 from entering the intersection KT at the same time. In the present embodiment in particular, the remote control unit 220 makes the priority order of the vehicle 100 higher as the avoidance capability of the vehicle 100 is higher, so that it is possible to prevent the preceding vehicle 100 from colliding against an obstacle at the intersection KT or on the third track SR3, and blocking a course of the following vehicle 100. Furthermore, in the present embodiment, the remote control unit 220 makes the priority order of the vehicle 100 higher as the reduction capability of the vehicle 100 is higher in the case where the avoidance capability is the same, so that, even if the preceding vehicle 100 collides against an obstacle at the intersection KT or on the third track SR3, it is possible to prevent the vehicle 100 and the obstacle from being damaged. Consequently, it is possible to prevent the course of the following vehicle 100 from being blocked in a longer term.

B. Second Embodiment

Figure 6:
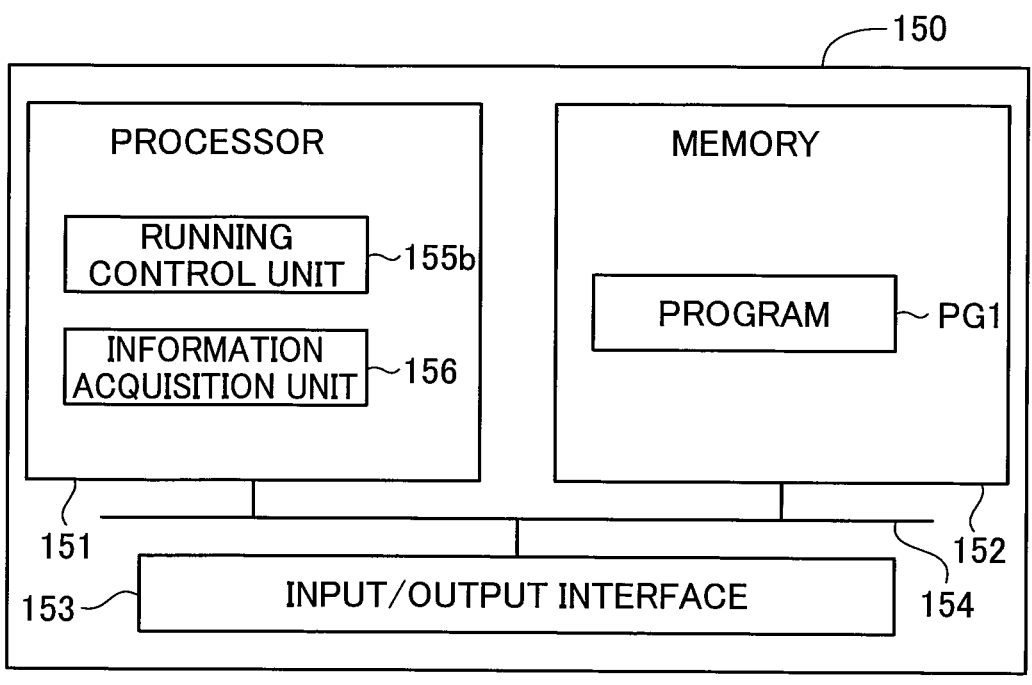
FIG. 6 is an explanatory view illustrating a configuration of the vehicle control device according to the second embodiment.

FIG. 5 is an explanatory view illustrating a configuration of an unmanned driving system 10*b* according to the second embodiment. FIG. 6 is an explanatory view illustrating a configuration of the vehicle control device 150 according to the second embodiment. As illustrated in FIG. 5, the second embodiment differs from the first embodiment in that the unmanned driving system 10*b* does not include the remote control device 200 and the vehicle 100 runs by autonomous control instead of remote control. The other components are the same as those in the first embodiment unless otherwise specified in particular. Note that a method for causing the vehicle 100 to run by autonomous control will be also referred to as an autonomous driving method or an unmanned driving method.

In the present embodiment, the vehicle 100 is configured to be able to run by autonomous control. The vehicle 100 can communicate with the external sensor group 300 and the process management device 400 by wireless communication that uses the communication device 140. As illustrated in FIG. 6, in the present embodiment, the processor 151 of the vehicle control device 150 functions as a running control unit 155*b* and an information acquisition unit 156 by executing the computer program PG1 stored in advance in the memory 152.

The running control unit 155*b* causes the vehicle 100 to run by generating a running control signal by itself and controlling the driving device 110, the steering device 120, and the braking device 130 using the generated running control signal. Reference routes, detection models, and the like are stored in advance in the memory 152. Note that the vehicle control device 150 will be also referred to simply as a control device, and the running control unit 155*b* will be referred to simply as a control unit.

The information acquisition unit 156 acquires capability information of an own vehicle and the capability information of another vehicle from the process management device 400. In a case where the capability information of the own vehicle is stored in advance in the memory 152, the information acquisition unit 156 may acquire the capability information of the own vehicle from the memory 152. In a case where the own vehicle and the another vehicle can communicate by wireless communication that uses the communication device 140, the information acquisition unit 156 may acquire the capability information of the another vehicle from the another vehicle.

In the present embodiment, the priority order determination processing illustrated in FIG. 3 is executed by the vehicle control device 150. When the own vehicle and the another vehicle are about to enter an intersection from different directions at the same time, the information acquisition unit 156 acquires the capability information of the own vehicle and the another vehicle that are about to enter the intersection. The information acquisition unit 156 can detect using, for example, the obstacle sensor 160 that the own vehicle and the another vehicle are about to enter the intersection from the different directions at the same time. The running control unit 155*b* determines the priority order of the own vehicle and the another vehicle using the capability information acquired by the information acquisition unit 156. The running control unit 155*b* controls the own vehicle such that the own vehicle and the another vehicle pass the intersection KT according to the priority order determined by the priority order determination processing.

Figure 7:
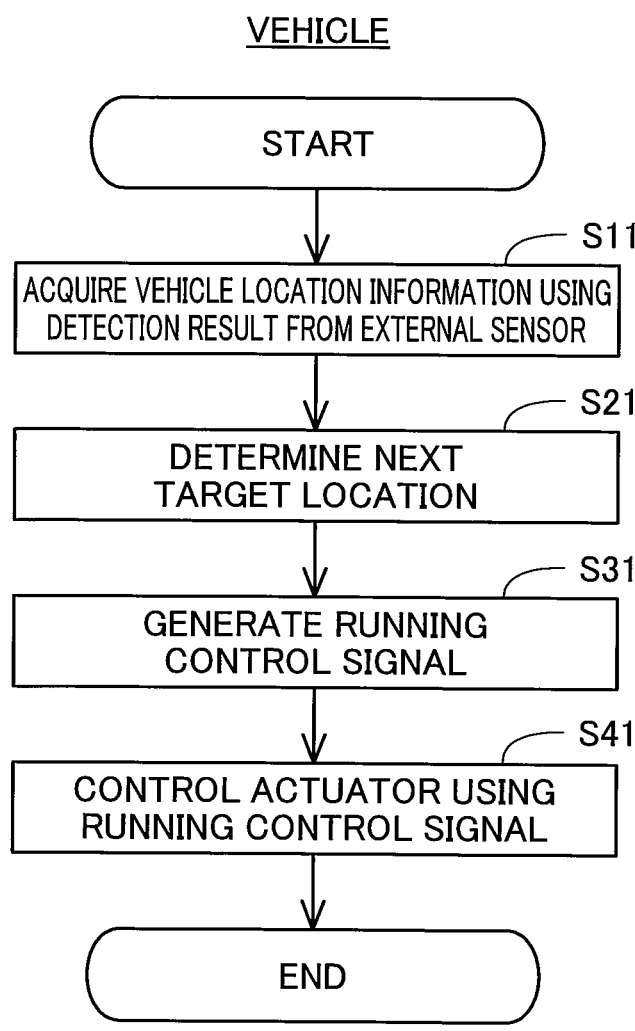
FIG. 7 is a flowchart illustrating a procedure of running control of the vehicle according to the second embodiment.

FIG. 7 is a flowchart showing a processing procedure for running control of the vehicle 100 in the second embodiment. In step S11, the vehicle control device 150 acquires vehicle location information using detection result output from the camera 301 as an external sensor. In step S21, the vehicle control device 150 determines a target location to which the vehicle 100 is to move next. In step S31, the vehicle control device 150 generates a running control signal for causing the vehicle 100 to run to the determined target location. In step S41, the vehicle control device 150 controls the driving device 110, the steering device 120, the braking device 130 using the generated running control signal, thereby causing the vehicle 100 to run by following a parameter indicated by the running control signal. The vehicle control device 150 repeats the acquisition of vehicle location information, the determination of a target location, the generation of a running control signal, and the control over the various devices 110 to 130 in a predetermined cycle.

Similar to the first embodiment, according to the unmanned driving system 10*b* according to the above-described present embodiment, when the plurality of vehicles 100 are about to enter the intersection KT from the different directions at the same time, it is possible to cause the plurality of vehicles 100 to pass the intersection KT in descending order of the priority order determined using the capability information. Consequently, it is possible to prevent the plurality of vehicles 100 from entering the intersection KT at the same time.

C. Other Embodiment (C1) According to the unmanned driving systems 10 and 10*b* according to each of the above-described embodiments, the information acquisition unit 210 or the information acquisition unit 156 acquires the capability information including the information related to both of the avoidance capability and the reduction capability, and the remote control unit 220 or the running control unit 155*b* makes the priority order of the vehicle 100 higher as the avoidance capability of the vehicle 100 is higher, and makes the priority order of the vehicle 100 higher as the reduction capability of the vehicle 100 is higher in the case where it is not possible to determine whether the avoidance capability is good or bad. By contrast with this, the information acquisition unit 210 or the information acquisition unit 156 may acquire the capability information including information related to one capability of the avoidance capability and the reduction capability. In this case, the remote control unit 220 or the running control unit 155*b* makes the priority order of the vehicle 100 higher as one capability of the avoidance capability and the reduction capability is higher.

(C2) In the unmanned driving systems 10 to 10*b* of the respective embodiments described above, the external sensor is not limited to the camera 301 but may be the distance measuring device, for example. The distance measuring device is a light detection and ranging (LiDAR) device, for example. In this case, detection result output from the external sensor may be three-dimensional point cloud data representing the vehicle 100. The remote control device 200 and the vehicle 100 may acquire the vehicle location information through template matching using the three-dimensional point cloud data as the detection result and reference point cloud data, for example.

(C3) According to the above first embodiment the remote control device 200 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The remote control device 200 may acquire vehicle location information, determine a target location to which the vehicle 100 is to move next, and generate a route from a current location of the vehicle 100 indicated by the acquired vehicle location information to the target location. The remote control device 200 may generate a route to the target location between the current location and a destination or generate a route to the destination. The remote control device 200 may transmit the generated route to the vehicle 100. The vehicle 100 may generate a running control signal in such a manner as to cause the vehicle 100 to run along the route received from the remote control device 200 and control the driving device 110, the steering device 120, the braking device 130 using the generated running control signal.

(2) The remote control device 200 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control the driving device 110, the steering device 120, the braking device 130 using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the remote control device 200 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(C4) According to the above second embodiment, the vehicle 100 may be equipped with an internal sensor, and detection result output from the internal sensor may be used in at least one of generation of a route and generation of a running control signal. For example, the vehicle 100 may acquire detection result from the internal sensor, and in generating the route, may reflect the detection result from the internal sensor in the route. The vehicle 100 may acquire detection result from the internal sensor, and in generating the running control signal, may reflect the detection result from the internal sensor in the running control signal.

(C5) According to the above second embodiment, the vehicle 100 acquires vehicle location information using detection result from the external sensor. By contrast, the vehicle 100 may be equipped with an internal sensor, the vehicle 100 may acquire vehicle location information using detection result from the internal sensor, determine a target location to which the vehicle 100 is to move next, generate a route from a current location of the vehicle 100 indicated by the acquired vehicle location information to the target location, generate a running control signal for running along the generated route, and control the driving device 110, the steering device 120, the braking device 130 of the vehicle 100 using the generated running control signal. In this case, the vehicle 100 is capable of running without using any detection result from an external sensor. The vehicle 100 may acquire target arrival time or traffic congestion information from outside the vehicle 100 and reflect the target arrival time or traffic congestion information in at least one of the route and the running control signal. The functional configuration of the unmanned driving system 10 may be entirely provided at the vehicle 100. Specifically, the processes realized by the unmanned driving system 10 in the present disclosure may be realized by the vehicle 100 alone.

(C6) According to the above first embodiment, the remote control device 200 automatically generates the running control signal to be transmitted to the vehicle 100. By contrast with this, the remote control device 200 may generate the running control signal to be transmitted to the vehicle 100 according to an operation of an external operator located outside the vehicle 100. For example, the external operator may operate a piloting device that includes a display that displays captured images output from the cameras 301 that are the external sensors, a steering, an accelerator pedal, and a brake pedal that remotely operate the vehicle 100, and a communication device that communicates with the remote control device 200 by wired communication or wireless communication, and the remote control device 200 may generate a running control signal matching an operation performed on the piloting device. According to this embodiment, when a remotely and manually driven vehicle that is remotely and manually driven by the operator, and another vehicle are about to enter the intersection KT from different directions at the same time, the remote control device 200 may cause the display of the piloting device to display information related to whether or not to prioritize the remotely and manually driven vehicle. In this case, by referring to the information displayed on the display, the operator can easily grasp whether or not the remotely and manually driven vehicle is prioritized. Furthermore, according to this embodiment, when the remotely and manually driven vehicle that is remotely and manually driven by the operator, and the another vehicle are about to enter the intersection KT from the different directions at the same time, the remote control device 200 may switch the remotely and manually driven vehicle from remote manual driving to remote autonomous driving, cause the vehicle that has been remotely and manually driven by the operator and the another vehicle to pass the intersection according to the priority orders by the remote autonomous driving, and then reset the vehicle that has been remotely and manually driven by the operator from the remote autonomous driving to the remote manual driving.

(C7) In each of the above-described embodiments, the vehicle 100 is simply required to have a configuration to become movable by unmanned driving. The vehicle 100 may embodied as a platform having the following configuration, for example. The vehicle 100 is simply required to include at least the vehicle control device 150 and the driving device 110, the steering device 120, the braking device 130 in order to fulfill three functions including "run," "turn," and "stop" by unmanned driving. In order for the vehicle 100 to acquire information from outside for unmanned driving, the vehicle 100 is simply required to include the communication device 140 further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from the factory KJ, or a remaining component such as a bodyshell may be mounted on the vehicle 100 after the vehicle 100 is shipped from the factory KJ while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(C8) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(C9) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

(C10) The control and the method described in the present disclosure may be realized by a dedicated computer provided by configuring a processor and a memory programmed in such a manner as to implement one or a plurality of functions embodied by a computer program. Alternatively, the controller and the method described in the present disclosure may be realized by a dedicated computer provided by configuring a processor using one or more dedicated hardware logic circuits. Still alternatively, the controller and the method described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof.

What is claimed is:

1. A control device comprising:

an information acquisition unit configured to acquire a capability information of a plurality of moving objects that can be moved by unmanned driving, wherein the capability information is related to at least one capability of avoidance capability of avoiding collision against an obstacle, and reduction capability of reducing an impact at a time of the collision against the obstacle; and a control unit configured to control unmanned driving of at least one moving object of the plurality of moving objects, wherein when the plurality of moving objects enter an intersection from different directions at a same time, the control unit controls the at least one moving object to cause the plurality of moving objects to pass the intersection according to a priority order determined in descending order of the at least one capability using the capability information, wherein the plurality of moving objects are moved by unmanned driving in a factory that manufactures the plurality of moving objects, wherein the capability information includes information indicating the number of times of reinspection of the moving object in the factory, and wherein the control unit makes the priority order higher as the number of times of reinspection is smaller.

2. The control device according to claim 1, wherein the control unit makes the priority order higher as the avoidance capability is higher, and makes the priority order higher as the reduction capability is higher in a case where the avoidance capability is the same.

3. The control device according to claim 1, wherein the capability information includes information indicating whether or not the moving object has an automatic avoidance function that is a function of automatically avoiding the collision against the obstacle, and the control unit makes the priority order of the moving object that has the automatic avoidance function higher than the priority order of the moving object that does not have the automatic avoidance function.

4. An unmanned driving method comprising:

acquiring a capability information of a plurality of moving objects that can be moved by unmanned driving, wherein the capability information is related to at least one capability of avoidance capability of avoiding collision against an obstacle, and reduction capability of reducing an impact at a time of the collision against the obstacle; and moving the plurality of moving objects by unmanned driving, wherein when the plurality of moving objects enter an intersection from different directions at a same time, causing the plurality of moving objects to pass the intersection according to a priority order determined in descending order of the at least one capability using the capability information, wherein the plurality of moving objects are moved by unmanned driving in a factory that manufactures the plurality of moving objects, wherein the capability information includes information indicating the number of times of reinspection of the moving object in the factory, and wherein the moving makes the priority order higher as the number of times of reinspection is smaller.

* * * * *